S. LEVY.
Vinegar Apparatus.

No. 220,539. Patented Oct. 14, 1879.

Witnesses:
Henry Eichling
Millard F. Clifton

Inventor:
Samuel Levy
By J. P. Fitch
his atty

2 Sheets—Sheet 2.

S. LEVY.
Vinegar Apparatus.

No. 220,539. Patented Oct. 14, 1879.

Witnesses:
Henry Eichling
Millard F. Clifton

Inventor
Samuel Levy
By J. L. Fitch
his atty.

UNITED STATES PATENT OFFICE.

SAMUEL LEVY, OF NEW YORK, N. Y.

IMPROVEMENT IN VINEGAR APPARATUS.

Specification forming part of Letters Patent No. 220,539, dated October 14, 1879; application filed December 27, 1878.

*To all whom it may concern:*

Be it known that I, SAMUEL LEVY, of the city, county, and State of New York, am the inventor of an Improved Apparatus for the Generation or Production of Vinegar, of which the following is a specification, reference being had to the accompanying drawings, forming part of the same.

Figure 1:
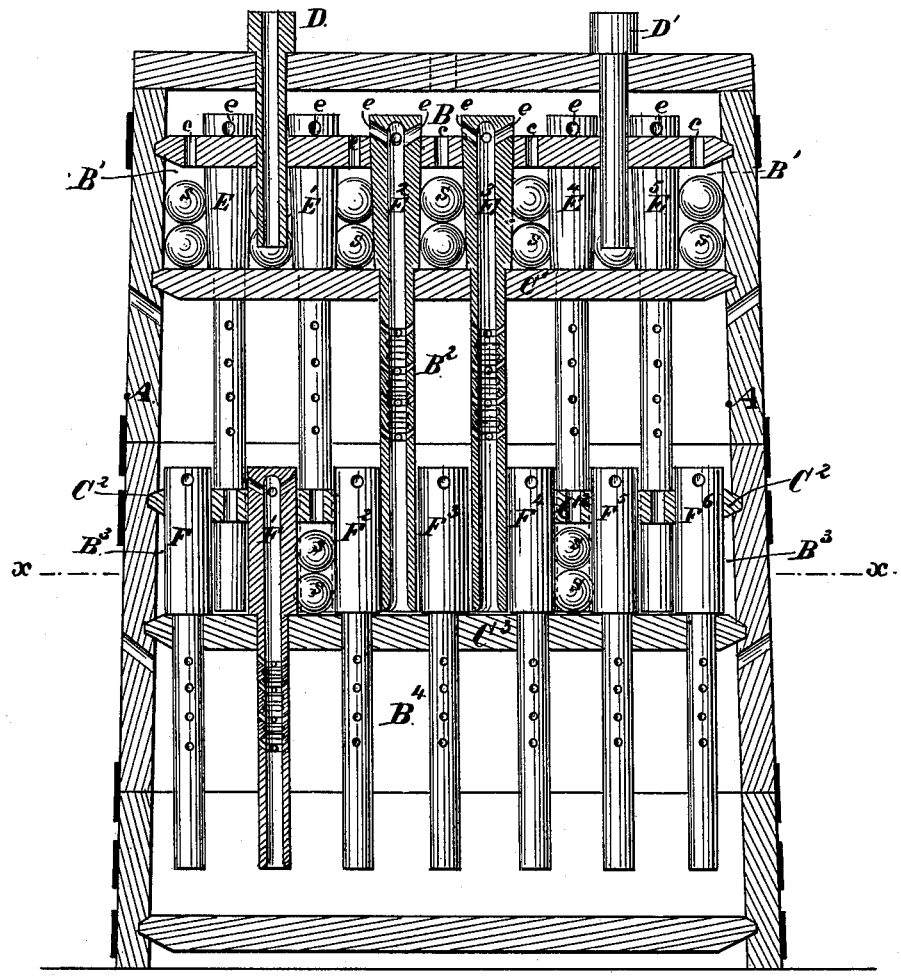
Figure 2:
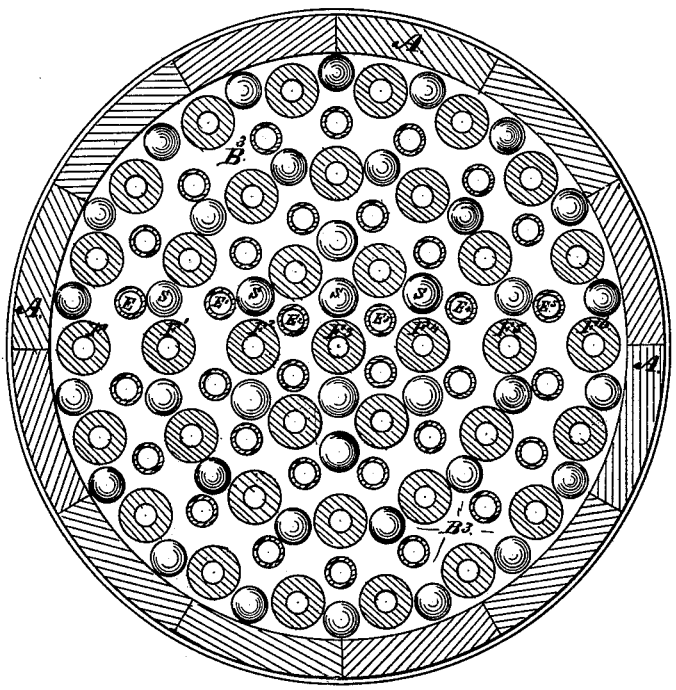

Figure 1 is a central vertical section, and Fig. 2 a cross-section of line $x$ $x$ of Fig. 1 of an apparatus embodying my invention.

My invention relates to an apparatus for the generation of vinegar, consisting of a tank or tub that is divided into several compartments by horizontal partitions, one above another, with several series of tubes, each series extending or leading from one compartment down into or through another, and wherein the mash or material of which the vinegar is to be made flows into one of the compartments of the tank, and accumulates there until it rises to the height of an inlet to the tubes which lead from such compartment, through said tubes into a lower compartment, and thence again through similar tubes into a still lower compartment, such apparatus, so far as I have indicated or described, being old and in use; but in such apparatus a trouble has been experienced in causing the mash or material to flow simultaneously through all the pipes leading from the several compartments, by reason of the fact that, unless the pipes in each compartment have their apertures through which the mash flows on a precisely horizontal level, the mash is liable to flow out through the lowest apertures, and thus be drained off without its flowing through the other tubes, as intended.

My invention has for its object the remedy of this difficulty, and consists in combining with the partitions and tubes, as hitherto used, an additional partition or partitions, whereby the mash is caused to flow equally through all the tubes, and also whereby the mash has an increased exposure to the air in its progress through the generator.

I will proceed to explain more fully my said invention.

A, Fig. 1, is a tank or vessel made, preferably, of wood and staves hooped together. It is divided into a series of chambers, B, $B^1$, $B^2$, $B^3$, and $B^4$ by the partitions C $C^1$ $C^2$ $C^3$.

D and D' are two pipes or tubes leading through the head of the tank into the compartment $B^2$. E, $E^1$, $E^2$, $E^3$, and $E^4$ indicate a series of tubes leading from compartment B into compartment $B^3$. F to $F^6$ indicate a similar series of tubes leading from compartment $B^2$ into compartment $B^4$.

The partitions C and $C^2$ are provided with a large number of small apertures, $c$, (shown in Fig. 1,) which open communication between the compartments above and below them.

The tubes are all fitted into the openings in the partitions, through which they pass with tight joints.

The tubes E and F have holes $e$ through their side walls, near their heads or upper ends, and immediately above said partitions C and $C^2$, so that fluid lying on the said partitions will run into the tubes through the said apertures. The said tubes are also provided with small apertures in the compartments $B^2$ and $B^4$, all as indicated in the drawings. There are four rows or series of these apertures, one on each quarter of the circumference of the tube, whereby the fluid, while trickling down through the tubes, will be to a greater extent exposed to the air passing through the apertures than when a less number of apertures is provided. The said tubes are severally made entire of one piece of material, the enterior chambers terminating near the upper end, thus closing the said upper end without the use of a separate cap, as has been heretofore common. A large number of the tubes E and F are used, as indicated in Fig. 2.

The shaded circles $s$ in both figures indicate a number of wooden balls, which fill the spaces between the tubes in the chambers $B^1$ and $B^3$. Usually wooden chavings are used in these chambers; but I find these wooden balls to be a great improvement, as they will take up and retain a larger quantity of vinegar, which, becoming intensely acid, contributes to the rapid acidifying of the mash that comes in contact with them. I therefore recommend the use of these balls.

Suitable outlet pipes and faucets are provided for the introduction of the mash or material of which the vinegar is to be made and the discharge of the vinegar.

The operation of the apparatus is as follows: The mash is introduced continuously into the compartment $B^1$ through the pipes C $C^1$, one or both, which, after filling said compartment, will rise through the aperture $c$ in the partition C, and then, flowing over the upper surface of said partition, will pass into the holes $e$ into the pipes E, thence down into apartment $B^3$, and, filling that apartment, will again rise through the apertures in the partition $C^2$, and thence over the surface of that partition into the holes in the heads of the tubes F, through those tubes into compartment $B^4$, and so on, through as many series of tubes, partitions, and compartments as there are in the tank.

In order to increase the surface of the inner chambers of the said tubes, grooves may be cut in them, as shown in $E^2$, $E^3$, and $F'$, Fig. 1.

What I claim as my invention, and desire to secure by Letters Patent, is—

The combination, in a vinegar-generator, of the partition C, provided with apertures $c$, with apartments B and $B^1$, pipes E, provided with holes $e$, and inlet-pipes leading into the apartment $B^1$, all as described.

SAMUEL LEVY.

Witnesses:
   J. P. FITCH,
   M. F. CLIFTON.